SUPERVISORY SIGNAL RECEIVING CIRCUIT

Filed Oct. 2, 1963

INVENTORS
TATSUKI WATANABE
TOSHIO ANDO
BY
Haseltine & Calmoflde
ATTORNEY 3,310,634

SUPERVISORY SIGNAL RECEIVING CIRCUIT

Tatsuki Watanabe and Toshio Ando, Tokyo, Japan, assignors to Nippon Electric Company Limited, Tokyo, Japan, a corporation of Japan Filed Oct. 2, 1963, Ser. No. 313,350
2 Claims. (Cl. 179—18)

This invention relates to a supervisory signal receiving circuit at the send end of a crossbar switchboard.

The supervisory signal is a general term for signals employed in controlling the switchboard in the terminating office from the originating office, and for indicating the condition of the switchboard of the terminating office at the switchboard in the originating office. In conventional supervisory signal receiving circuits, however, two considerably expensive polarized relays are employed to support the functional requisites.

It is therefore an object of the present invention to provide a supervisory signal receiving circuit in which only one polarized relay is used, so that a crossbar automatic switchboard may be more economically constructed.

One method for indicating the condition of the terminating office, such as the obtaining of an incoming trunk, the connection of a register, or the completion of preparation for receiving the selecting signals in the register, at the originating office is to reverse the polarity of the current flowing in the line whenever the condition of the terminating office is changed. The condition of the terminating office may thus be distinguished by detecting at the sender, the number of current polarity reversals in the line. The polarized relays previously referred to are commonly used for this purpose as follows:

Each polarized relay is usually provided with an operating winding and biasing winding, the latter of which has applied thereto a constant current so as to attract the moving contact to one side. When the operating current is made to flow in the operating winding in a direction opposed to that in the biasing winding the magnetic lines of force caused thereby overcomes that of the biasing current, causing the moving contact of the relay to seek the other side. Inasmuch as whenever the condition of the terminating office changes, two lines (for example, those denoted A and B in the detailed description to follow) reverse polarity. The discrimination of the "on" condition (A is (−), B is (+)) from the "off" condition (A is (+) B is (−)) is performed at present by respective polarized relays.

It is a further object of this invention to discriminate the change in condition of the terminating office, using only one polarized relay, without necessitating an alteration in the present method for indicating such a change.

Briefly, the invention is promulgated upon the concept of reversing the direction of the bias current, in the single polarized relay, whenever the polarities are subject to change.

Figures 1, 2:
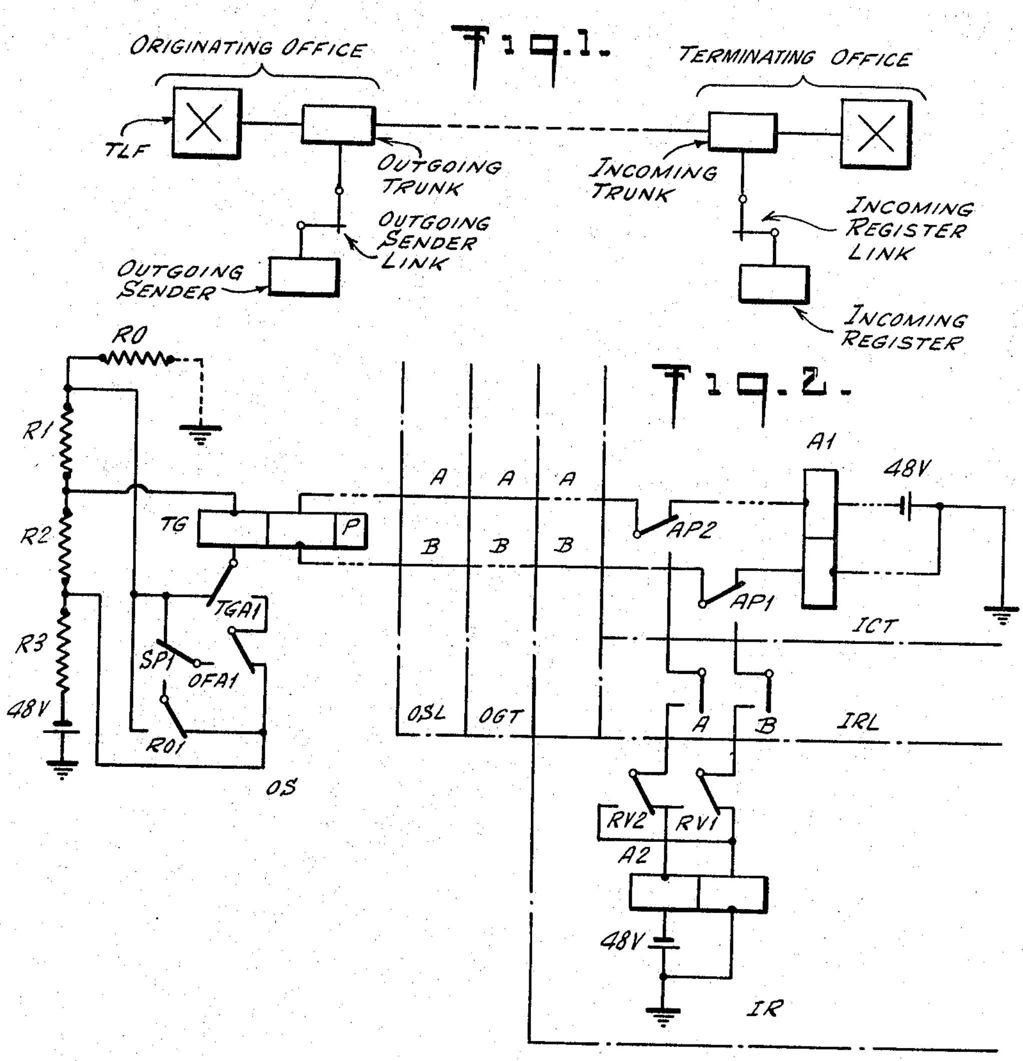
Figure 3:
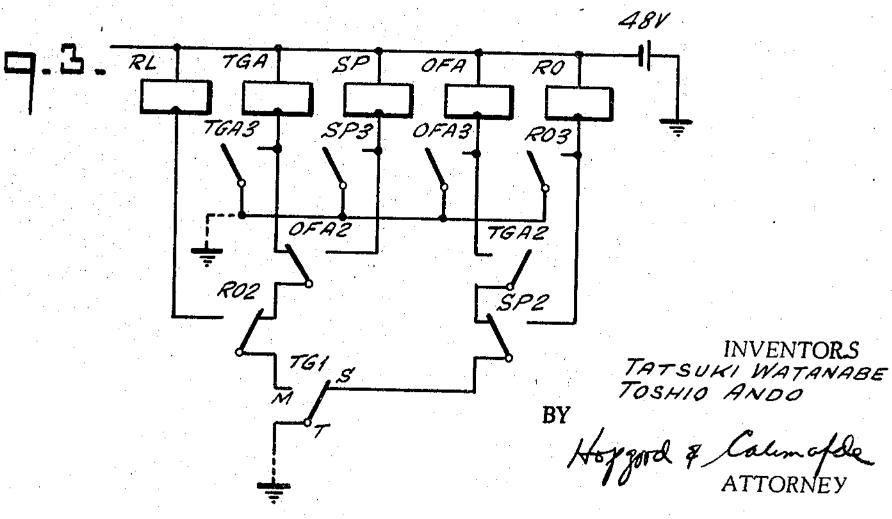

The above mentioned and other features and objects of this invention and the manner of attaining them will become more apparent and the invention itself will best be understood by reference to the following description of an embodiment of the invention taken in conjunction with the accompanying drawings wherein:

FIG. 1 illustrates schematically the connection of the switchboards both in the originating office and the terminating office in which the present invention may be embodied, FIG. 2 shows a schematic diagram of an embodiment of the invention illustrating the polarized relay main and biasing windings and the circuits therefor in the supervisory signal receiving circuit, and FIG. 3 illustrates the memory circuit in the supervisory signal receiving circuit for controlling the contacts in FIG. 2.

Referring now to the drawings, and particularly to FIG. 1, the outgoing sender OS of the originating office will be connected to the incoming trunk ICT of the terminating office through the outgoing sender link OSL, the outgoing trunk OGT, and the line, by the conventional method, well known in the art. The incoming trunk ICT of the terminating office will connect to the incoming register IR through the incoming register link IRL in preparation for the sending of the selecting signal from the outgoing sender OS of the originating office to the incoming register IR.

In FIGS. 2 and 3, TG is the polarized relay, A, RL, TGA, SP, OFA, and RO are electromagnetic relays in the supervisory signal receiving circuit) hereinafter referred to as "relay"); the suffix symbols showing the respective relay contacts. In FIG. 2, the relay AP of the incoming trunk ICT and the relay RV of the incoming register IR are not shown except for their contacts.

Turning now to FIG. 2 initially the outgoing sender OS of the originating office is connected to the incoming trunk ICT of the terminating office, as was mentioned, and thus the circuit; ground of the incoming trunk ICT—the lower side winding of the relay A1—the normally closed side of the contact AP1—the line—the outgoing trunk OGT—the B line of the outgoing sender link OSL—the right hand side winding (hereinafter referred to as "operating winding") of the polarized relay TG—the outgoing sender link OSL—the outgoing trunk OGT—the A line—the normally closed side of the contact of AP2 of the incoming trunk ICT—the upper side winding of the relay A1; is established. Consequently the contact TG1 (see FIG. 3) of the polarized relay TG is attracted to the M side.

Thus from FIG. 3 it may be seen that the relay TGA is energized by the completion of the circuit; ground—the M side of the contact TG1—and normally closed side of the contact OFA2. The relay TGA is then self held by the action of moving contact TGA3. Turning now to FIG. 2 it may be seen that when the relay TGA is operated, the biasing current for the relay TG will flow through the circuit; ground—resistor R0—resistor RI—the left hand side winding of the polarized relay TG (hereinafter referred to as "biasing winding")—the normally open side of the contact TGA1—the normally closed side of the contact OFA1—the resistor R3—and the battery. This biasing is now reversed with respect to the initial biasing current flowing through the circuit, but is the same as that of the current flowing through the operating winding. Thus the contact TG1 is maintained on the M side, and the circuit is prepared for the next change in line condition. The operation of the relay TGA has indicated that the outgoing sender OS is properly connected to the incoming trunk ICT.

When the incoming trunk ICT is connected to the incoming register IR through the incoming register link, the crosspoints A and B of the incoming register link IRL will be closed (not shown), and the relay AP of the incoming trunk is operated. The relay RV of the incoming register IR then operates in the well known manner. When RV swings over the relationship of the lines A and B to the applied potential reverses and the operating current through the polarized relay TG likewise reverses (the circuit may easily be traced on FIG. 2 and for the sake of brevity will not be detailed). Inasmuch as the magnetic lines of force caused by the operating current will overcome that caused by the biassing current, as a result of the operation of relay TGA, the contact TG1 will be attracted to the S side as shown in FIG. 3. The relay OFA now operates through ground—the Side side of the contact TG1—the normally closed side of the contact SP2— and the normally open side of TGA2. As with TGA this relay is now self held.

With the energization of OFA and TGA the biasing for the polarized relay TG again reverses, as may be seen in FIG. 3, by virtue of the new relationship the voltage divider circuit R0–R3 bears the biasing winding. As before it is coincident with the direction of the current in the operating winding and thus the contact TG1 shown in FIG. 3 is maintained in attracted position S, and the circuit is prepared for the next change in line condition. The operation of the relay OFA indicates that the outgoing sender is properly connected to the incoming register.

When the preparation for the reception of the selecting signal is completed in the incoming register IR, the relay RV in the incoming register IR will be restored in the well known manner. The line current again reverses and its affect on the operating winding of polarized relay TG now causes the contact TG1 to again be attracted to the M side. The relay SP now operates (FIG. 3) through the normally closed contact of R02 and the contact OFA2 of the self held relay OFA. This causes another reversal in the biasing current and the preparation of the circuit for the next change in line polarities with the contact TG1 being maintained attracted to the M side. The operation of the relay SP indicates at the outgoing sender OS that preparation of receiving the selecting signal in the incoming register IR is completed.

Where any malfunction is detected in the incoming register it is the general practice for the RV relay to again operate. In a manner similar to that previously described the line current again reverses and polarized relay TG is again attracted to the S side. The relay R0 then operates reversing the biasing current and maintaining the contact TG1 on the S side. The outgoing sender OS will receive, by the operation of the relay R0, the information that the incoming register IR has detected a malfunction.

Finally the relay RV will be restored after about 100 milliseconds: thus the polarized relay TG will be provided with another operating current reversal; the contact TG1 will be attracted to the M side; the relay RL energized; and the outgoing sender OS directed to restore.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In a telephone supervisory signal receiving circuit for distinguishing changes in condition at a distant office, the indicia of which is a change in line polarity; a polarized relay having a biasing and an operating winding, the latter of which is in series with said line; potential means coupled to the biasing winding of said polarized relay for the biasing thereof; means under control of said polarized relay for indicating a change in polarity of said line; and means coupled to said potential means and responsive to said indicating means for reversing the biasing potential on said polarized relay.

2. The apparatus claimed in claim 1 in which said indicating means comprises a group of relays at least one contact of each of which is included in circuit in said reversing means.

References Cited by the Examiner

UNITED STATES PATENTS

| | | | |
|---|---|---|---|
| 2,029,723 | 2/1936 | Johnson et al. | 179—16 |
| 2,071,072 | 2/1937 | Johnson | 179—16 |
| 2,071,078 | 2/1937 | Law | 179—16 |

KATHLEEN H. CLAFFY, *Primary Examiner.*

WILLIAM C. COOPER, *Examiner.*